Figure 1:
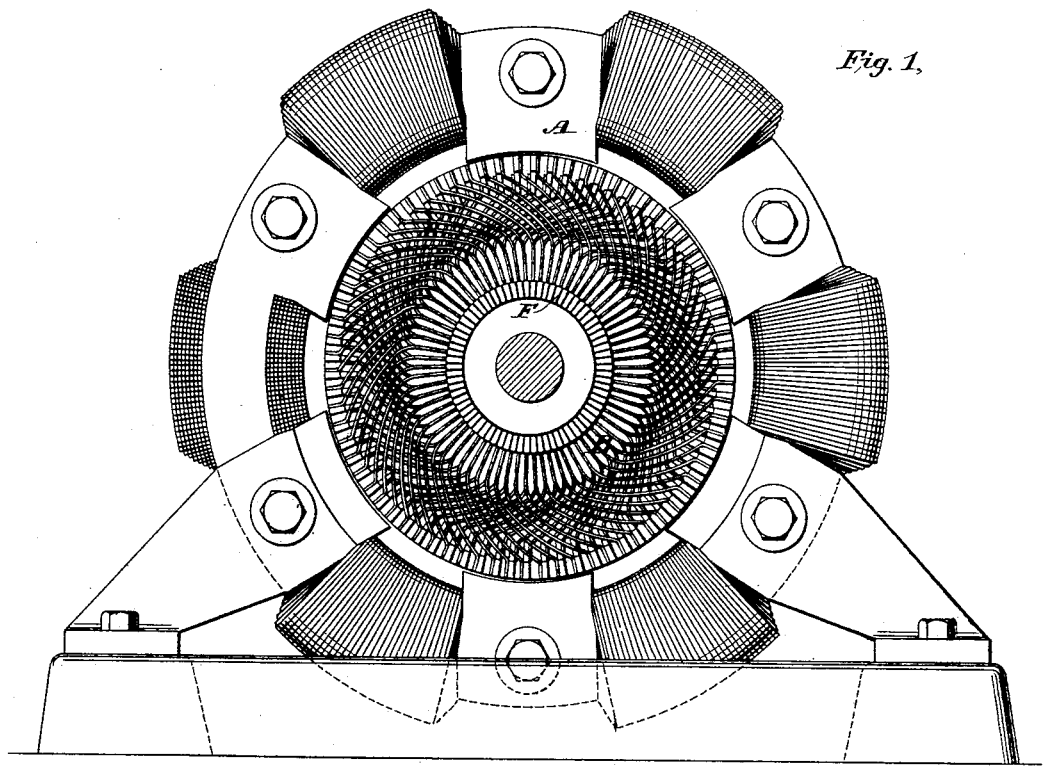

(No Model.) 4 Sheets—Sheet 1.

C. S. BRADLEY.
DYNAMO ELECTRIC MACHINERY.

No. 394,818. Patented Dec. 18, 1888.

Witnesses,
Geo. W. Breck.
William L. Dreyer

Inventor,
Chas. S. Bradley
By his Attorneys
Curtis & Crocker (No Model.) 4 Sheets—Sheet 2.
C. S. BRADLEY.
DYNAMO ELECTRIC MACHINERY.
No. 394,818. Patented Dec. 18, 1888.
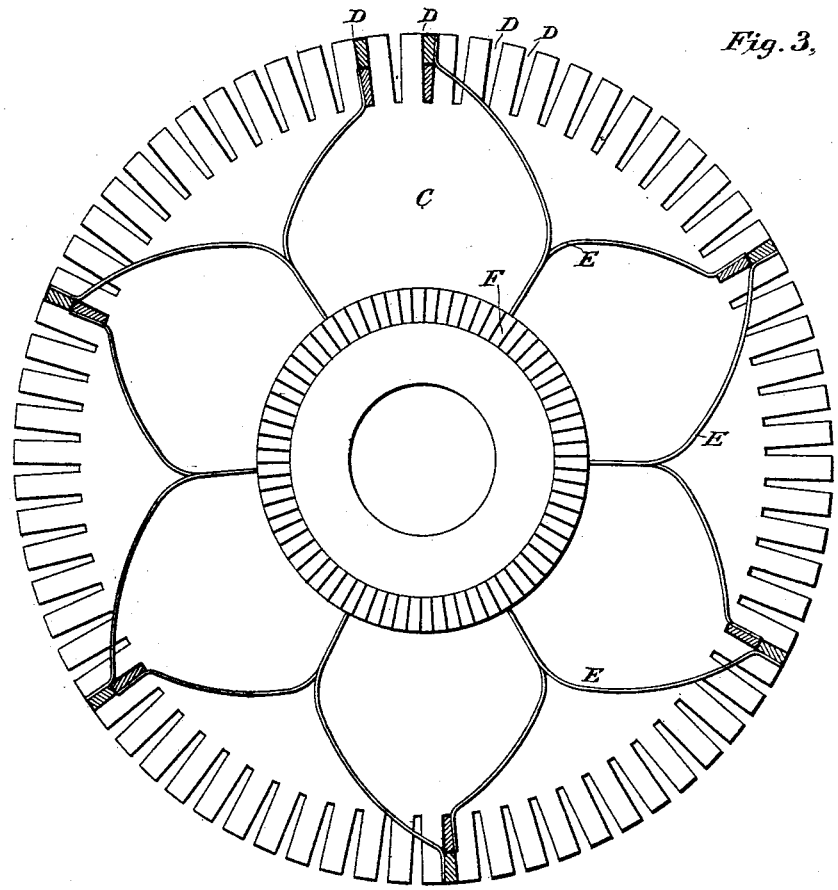
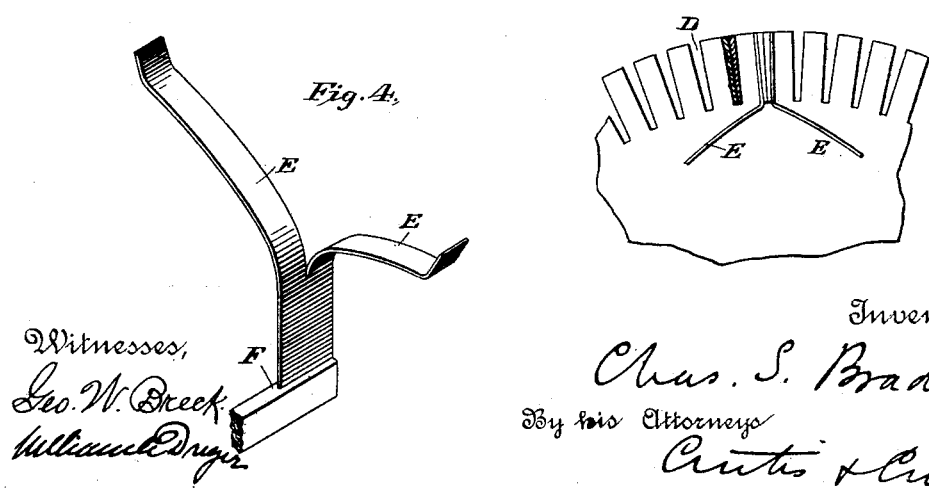

(No Model.)
4 Sheets—Sheet 3.

C. S. BRADLEY.
DYNAMO ELECTRIC MACHINERY.

No. 394,818. Patented Dec. 18, 1888.

WITNESSES:

Charles S. Bradley, INVENTOR

BY McTighe & Worthington
ATTORNEYS.

(No Model.)  4 Sheets—Sheet 4.
C. S. BRADLEY.
DYNAMO ELECTRIC MACHINERY.
No. 394,818.  Patented Dec. 18, 1888.
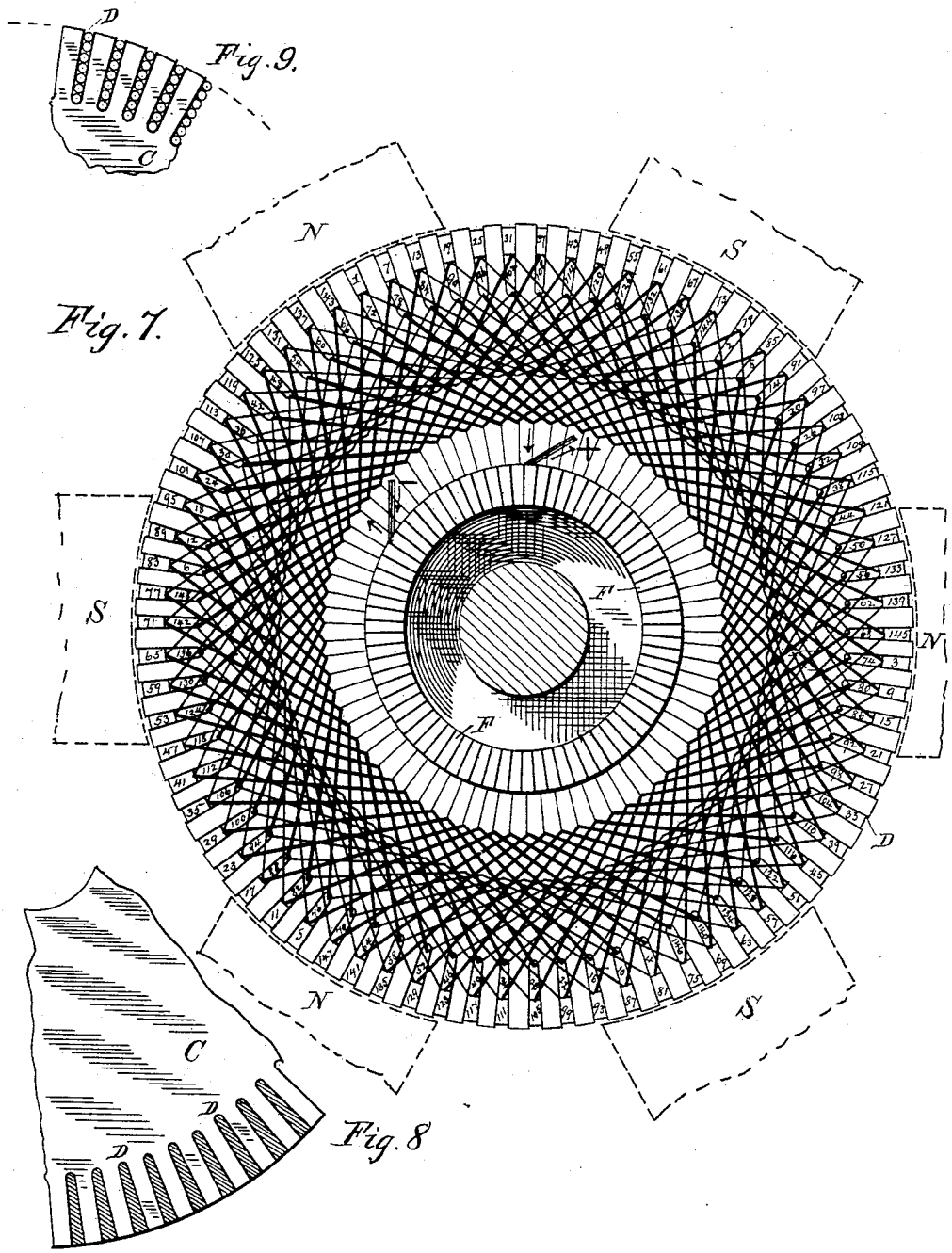
Witnesses:—
E. Myers
S. Burnier
Charles S. Bradley
Inventor
McTighe & Worthington
Attorneys

UNITED STATES PATENT OFFICE.

CHARLES S. BRADLEY, OF YONKERS, NEW YORK.

DYNAMO-ELECTRIC MACHINERY.

SPECIFICATION forming part of Letters Patent No. 394,818, dated December 18, 1888.

Application filed July 25, 1887. Serial No. 245,172. (No model.)

*To all whom it may concern:*

Be it known that I, CHARLES S. BRADLEY, of the city of Yonkers, county of Westchester, and State of New York, have invented a new and useful Improvement in Dynamo-Electric Machines and Electric Motors, of which the following is a specification.

In dynamo-machines I have found that where the reversals are very frequent eddying or local currents are produced in the windings, even when they are of comparatively small wire, and when the winding consists of bars or large wires these eddying or local currents become so serious as to impair the efficiency of the machine. These eddying or local currents are due to the fact that one side of the conductor passes into the magnetic field before the other side, so that some of the "lines of force" pass through one side of the conductor while none or a less number of lines of force are passing through the other side, so that an electro-motive force is developed on one side of the conductor while no electro-motive force or a less electro-motive force is being developed on the other side, and thus the two sides of the conductor form a closed circuit in which a local current is generated every time the bar enters and every time it emerges from the field. Although this electro-motive force is produced for only a very short period of time, yet the resistance of this local circuit is so extremely low that a great strength of current is developed, and the consequence is that the conductor soon becomes heated in this way, and its safe carrying capacity for current which is supplied to the external circuit is thereby reduced. These eddying currents are produced to some extent in the ordinary two-pole machine, where the width of the bars or windings is comparatively great; but they become very much greater in the multipolar machines, because the number of reversals or the number of times that the bar enters and leaves the magnetic field is increased in proportion to the number of poles, and consequently the eddying currents are produced with corresponding frequency during each revolution of the armature.

One of the objects of my present invention is to reduce these eddying or local currents and construct the machine in such a way that the armature-winding may be composed of very much larger wires or conductors than has heretofore been possible, without any loss either of efficiency or of capacity from this cause.

Another object of my invention is to produce a machine in which the magnetic circuits are as nearly complete as possible, the clearance necessary for the rotation of the armature being the only break in the continuity of the magnetic circuits, and which circuits are practically uniform or of the same magnetic capacity throughout, and at the same time furnishing a large mass of iron to concentrate and direct the lines of force, thus producing powerful magnetic action with a small amount of copper and iron and extremely small expenditure of energy in the field, because the magnetic circuit has the smallest possible break, and at the same time increasing the strength of the magnetic field, and consequently the electro-motive force, and also permitting the use of larger conductors in the armature without reducing its magnetic capacity.

To accomplish these results, I construct the armature-core so that it reaches out to the faces of the pole-pieces and entirely fills the cylindrical armature-space, whereby the armature-core is as nearly in contact with the pole-pieces as is practicable for its rotation, and I sink the copper conductors or windings in grooves formed lengthwise in the periphery of the core. By properly proportioning the projecting iron ribs left between the grooves on the iron drum I have found that all eddying or local currents in the bars are to a large extent prevented.

To these and other ends my invention consists in constructing a dynamo-electric machine or electric motor with longitudinally-grooved iron armature and field-magnets and pole-pieces, the relations being such that the ribs under any pole-piece are equal in combined magnetic capacity to the core or cores of the field-magnet energizing said pole-piece.

Further, my invention consists in an iron armature having longitudinal peripheral grooves and intervening ribs with insulating-conductors laid or wound therein, as hereinafter shown.

Further, my invention consists in the special relation of conductors on the armature described; and, finally, the invention comprises the combination and arrangement of parts, all substantially as hereinafter more fully described and claimed.

Figure 2:
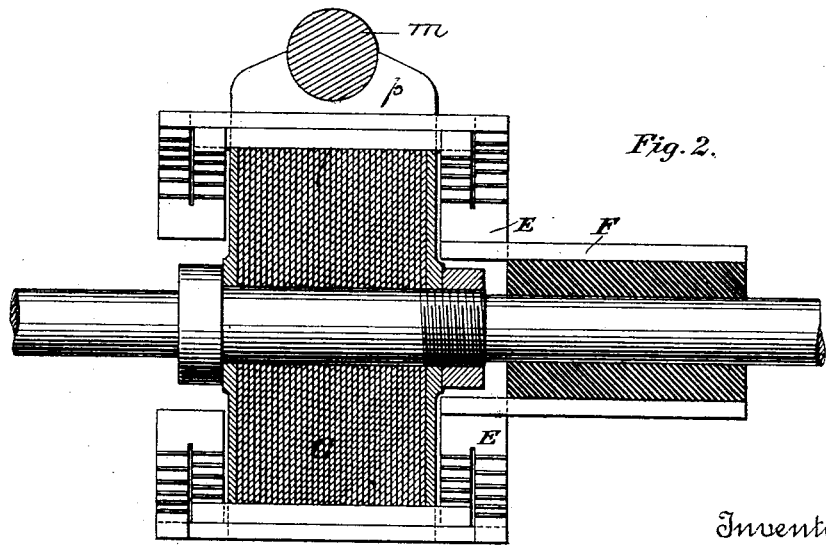
Figure 6:
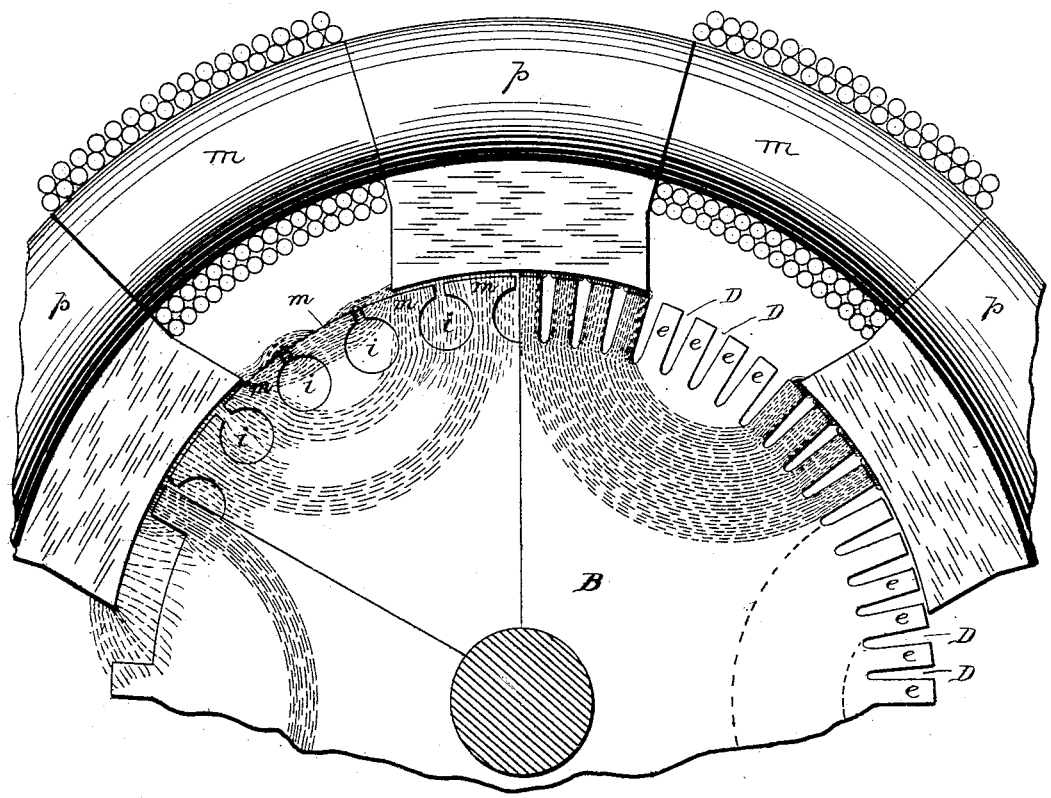

In the accompanying drawings, Figure 1 represents an end view of my machine, showing the multipolar field. Fig. 2 is a longitudinal section of the armature. Fig. 3 is a detail end view of the armature, showing a few of the commutator-connections and style of winding outlined. Fig. 4 is a detail view of one of the commutator-connectors. Fig. 5 is a modified arrangement of conductors in the grooves. Fig. 6 is a diagram of a part of an armature and multipolar field-magnet, the armature having three different styles of winding and magnetic relations with the corresponding distribution of the lines of force illustrated. Fig. 7 is an end view of my armature with winding and commutator, showing connections. Fig. 8 is a detail showing grooves with one bar in each. Fig. 9 is a detail showing a number of convolutions of wire wound in each groove for high-pressure currents.

In Fig. 1, A represents the field, which I have shown in the form of a six-pole multipolar field. B represents the armature. The armature-core C, which may be built up of laminæ or thin disks in the ordinary way, to prevent the generation of Foucault currents, is made so as to fit as nearly as possible the cylindrical space within the pole-pieces, only sufficient space between the two being left for proper clearance of rotation. In the convex surface of the iron drum or core C thus formed are cut grooves D D D, &c., the number of these grooves and their shape depending upon the size of the machine and other conditions.

The armature I have shown is provided with seventy-four equidistant grooves, which I prefer to make wedge-shaped, so that the two sides of the intervening iron are parallel, and consequently the cross-section of this iron portion is the same at all depths, or, at least, as small at the periphery as it is within; but of course the slots may be made of any desired shape. The proper depth for these slots depends upon the strength of current to be permitted in the machine; but in all cases it seems essential to have these slots or grooves of very much greater depth than width, and the ribs left standing between them of much greater height than thickness, in order to properly carry out the principles of my invention. Each slot may be provided with a single bar, (see Fig. 8,) or, if more electromotive force is required, two bars, as I have shown; or any number of bars or wires may be placed in each slot. (See Fig. 9.)

In Figs. 3 and 7 I have shown two bars arranged in each slot. These copper bars are drawn of trapezoidal form, one to fit the bottom part of the slot and the other the top part, the bottom one being enough wider or deeper than the top one in order to have the same cross-section, and they can be conveniently insulated from each other and the iron core by mica insulation. The general plan of the armature-winding which I prefer to employ is that patented in United States Patent to Muller, No. 331,726, December 1, 1885, improved and adapted by me, as herein described, to simple forms of connecting. In order to connect the copper bars with each other in succession and with the commutator according to the plan described in the said Muller patent, I have devised a very convenient and efficient means of connection. This consists of copper Y-shaped connecting-pieces E, stamped or otherwise cut from a single sheet or strip of copper and bent into the form shown in Fig. 4. The straight ends of these connectors E are connected in any convenient way with the commutator-strips F—by letting them into slots, for example—and the forked ends are respectively connected with such outer and inner bars as are to be connected together, the outer bars projecting at the ends of the armature beyond the inner bars, as shown in Fig. 2, so as to permit the connectors to be put in place without interfering with each other, as will clearly be understood from Figs. 1, 2, and 4. At the other end of the armature the bars are connected in the proper way by a similar set of connectors, the only difference being that this set of connectors has no inwardly-projecting portions to connect with the commutator.

The whole scheme of winding is clearly illustrated in Fig. 7, which shows the grooved armature with two superposed bars laid in each of the grooves D, the outer bars overhanging at the ends, as shown in Fig. 2, the commutator F, while the six-pole field is represented in dotted lines. Each of the bars is numbered, and the numbers from 1 upward are given to the bars in the order of their connection. The connectors E between bars at the commutator end are represented by heavy black lines, and the connectors between bars at the opposite end of the armature are designated by thinner lines. By following these connections it will be seen that, starting from the negative brush in one direction, the circuit is back through bar 1, across the rear, forward through bar 2, across the front and back through bar 3, across the rear and forward through bar 4 across the front and back through bar 5, across the rear and forward through bar 6, thence to bar 7, and so on around and around until finally it comes forward through bar 148 and unites by a connector with bar 1, making a complete closed circuit, which is then thrown into multiple by placing the brushes at an angle of either sixty degrees or one hundred and eighty degrees, according to convenience of access. The entire winding therefore constitutes a series of rectangles, the two principal sides of each of which are in this case substantially sixty degrees apart, and hence at a given moment receive the inductive effect at two points of the path of imaginary rotation, both inductive effects being in a common direction in the rectangle considered as a circuit, and therefore accumulative. Under such conditions of winding and the relations of it with the iron of the armature and field-magnet there is practically no distortion of the magnetic circuit by the current in the armature-conductor.

The distance between the consecutive slots in the armature-core in this machine should be such that, retaining as a factor the length of the armature and pole-piece, the aggregate cross-section of the iron or the magnetic carrying capacity of the armature-core at one time under each pole-piece should be sufficient to carry all the magnetism developed by the field core or cores which energize each pole-piece. In other words, the cross-sectional area of all the ribs under any pole-piece is at least equal to that of the field-magnet core or cores energizing that pole-piece, so that all the lines of force will be carried by the iron of the armature-core and none will pass through the copper bars or winding.

An inspection of Fig. 6 will make evident the advantages gained by giving the iron ribs $e$ of the armature the form and proportions hereinbefore indicated—i. e., a surface exposure to the pole-piece equal at least to the cross-sectional area of the core or cores of the field-magnet energizing such pole-piece, and an undiminished sectional area of iron between the surface and body of the armature. The figure shows such proportions at the right, and shows at the left of its center a form of undercut groove, $i$, for the winding—i. e., grooves having overhanging ribs $e$ between them, and consequently a diminished sectional area of iron between the surface and body of the armature.

At the extreme left of Fig. 6 is shown a grooved armature wherein the groove is wider than its depth and gives space for many conductors. The lines of force are indicated approximately as to their distribution and circuits in each case. By my method of proportioning the ribs $e$, however, so that their magnetic capacity shall be at least equal to that of the core or cores $m$, Figs. 2 and 6, energizing the inducing-poles $p$, and such carrying capacity is fully preserved to the full depth of the ribs and undiminished by undercutting, I at once largely reduce the possibility of eddy-currents in the conductors and of magnetic short circuit from rib to rib; and this is true independently of the depth of my grooves D, so long as I retain enough ungrooved iron in the armature-body to carry the total induced magnetism. Suppose, for instance, each pole-piece is energized jointly by two cores each of seven square inches sectional area, making a total of fourteen square inches. If the thickness of each armature-rib be one-fourth inch and eight ribs lie under the pole-piece at once, there will be a total rib thickness of two inches. Hence if I make the pole-piece and the armature-body each seven inches long the total surface of the ribs under that pole-piece will be fourteen square inches, and the ribs will carry all the magnetism that can be induced in that pole-piece. Obviously the lengths of the pole-piece and armature-core become an essential factor in the proportioning of the sizes and relations.

Upon consideration of this construction of machine it will be found that not only is the capacity of the magnetic circuits greatly increased and the electro-motive force of the machine thereby raised, and at the same time the amount of energy required to charge the field is very greatly reduced, but that the current capacity of the machine can be indefinitely increased, and without affecting the electro-motive force, by increasing the depth of these grooves, which hold the bars or winding, the only effect of increasing the depth of these slots being the slightly-increased length of the magnetic circuit or path through which the magnetism passes.

I claim as my invention—

1. An iron armature having longitudinal peripheral grooves of greater depth than width, with intervening iron ribs, and insulated conductors laid in said grooves, in combination with field-magnets and pole-pieces, the proportions between armature, field-magnet cores, and pole-pieces being such, substantially as described, that the ribs under any pole-piece are at least equal in combined magnetic capacity to the core or cores of the field-magnet energizing said pole-piece.

2. An armature composed of an iron core having longitudinal peripheral grooves, insulated conductors laid in said grooves, and end connections joining said conductors in pairs in rectangles, in combination with a multipolar field-magnet system presenting opposite polarities to the respective sides of each such rectangles, substantially as described.

3. In an armature having its conductors or windings connected in predetermined rectangles spanning several sections of winding, the combination, with the conductors, of the bifurcated connectors E, substantially as described.

CHARLES S. BRADLEY.

Witnesses:
WILLIAM A. DREYER, Jr.
CHAS. J. MAGUIRE.